United States Patent [19]
Huston

[11] Patent Number: 5,236,727
[45] Date of Patent: Aug. 17, 1993

[54] TACO SHELL

[76] Inventor: Roy Huston, 19422 Rawhide Rd., Sonora, Calif. 95370

[21] Appl. No.: 792,165

[22] Filed: Nov. 14, 1991

[51] Int. Cl.$^5$ .............................................. A21D 13/00
[52] U.S. Cl. ..................................... 426/138; 426/94; 426/391
[58] Field of Search ............... 426/138, 502, 505, 496, 426/391, 94

[56] References Cited

U.S. PATENT DOCUMENTS

| | | | |
|---|---|---|---|
| D. 251,256 | 8/1984 | Gilliam | D7/76 |
| D. 251,536 | 4/1979 | Hansen | D7/96 |
| 2,600,566 | 6/1952 | Moffett | 99/221 |
| 2,664,812 | 1/1954 | Molina | 99/426 |
| 3,219,460 | 11/1965 | Brown | 99/192 |
| 3,271,552 | 9/1966 | Krajewski | 219/10.55 |
| 3,835,291 | 9/1974 | Mannix | 219/10.55 |
| 3,857,009 | 12/1974 | MacMaster et al. | 219/10.55 |
| 4,190,757 | 2/1980 | Turpin et al. | 219/10.55 |
| 4,197,792 | 4/1980 | Mendoza | 99/349 |
| 4,554,865 | 11/1985 | Caridis et al. | 99/353 |
| 4,735,513 | 4/1988 | Watkins et al. | 383/116 |
| 4,781,932 | 11/1988 | Skarra et al. | 426/138 |
| 4,896,820 | 1/1990 | Harrington | 229/100 |
| 4,925,032 | 5/1990 | Liles | 206/564 |
| 4,931,303 | 6/1990 | Holm et al. | 426/549 |
| 4,938,975 | 7/1990 | Waller | 426/91 |
| 4,987,280 | 1/1991 | Kanafani et al. | 219/10.55 |

Primary Examiner—George Yeung
Attorney, Agent, or Firm—Fish & Richardson

[57] ABSTRACT

A corn tortilla for use, e.g. as a taco shell, an edible wrapper, preferably having a narrow partially cooked flexible strip across the central diameter and a fully cooked firm and crispy texture adjacent the flexible area, that can be folded into the typical taco shell U-shape. Preferably, the tortilla is cooked in a microwave oven using two perforated rigid and reusable microwave energy transparent frame members between which a flat fresh uncooked tortilla is positioned. Selective microwave attenuation by a conductive screen strip means, and controlled expansion and distortion of the tortilla by the frame members provide the double textured food end product with desirable surface bubbling and blistering.

15 Claims, 2 Drawing Sheets

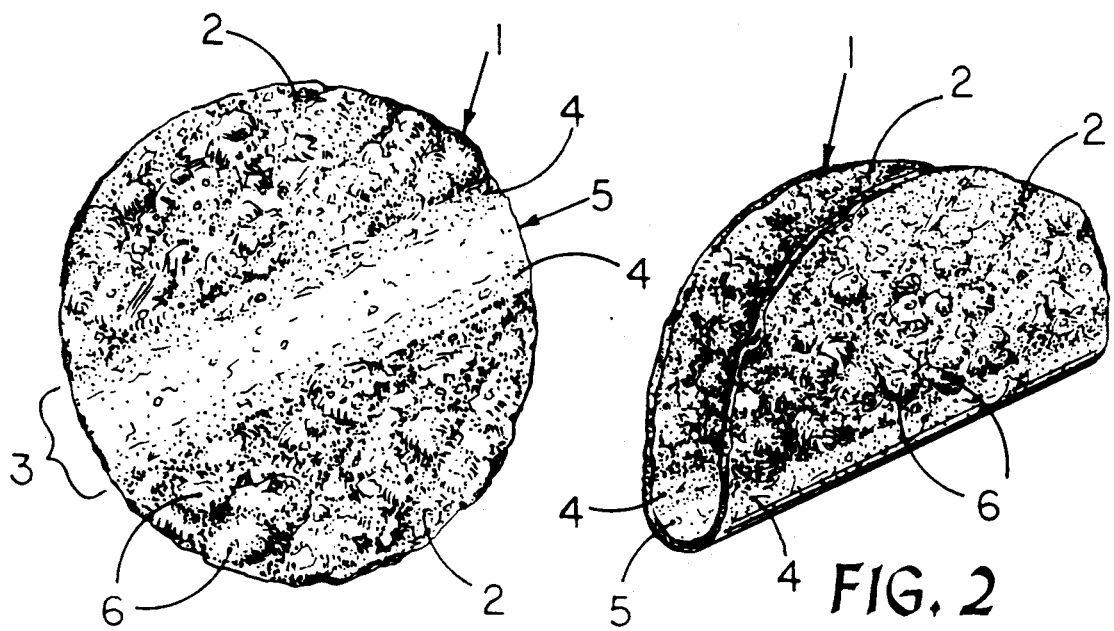
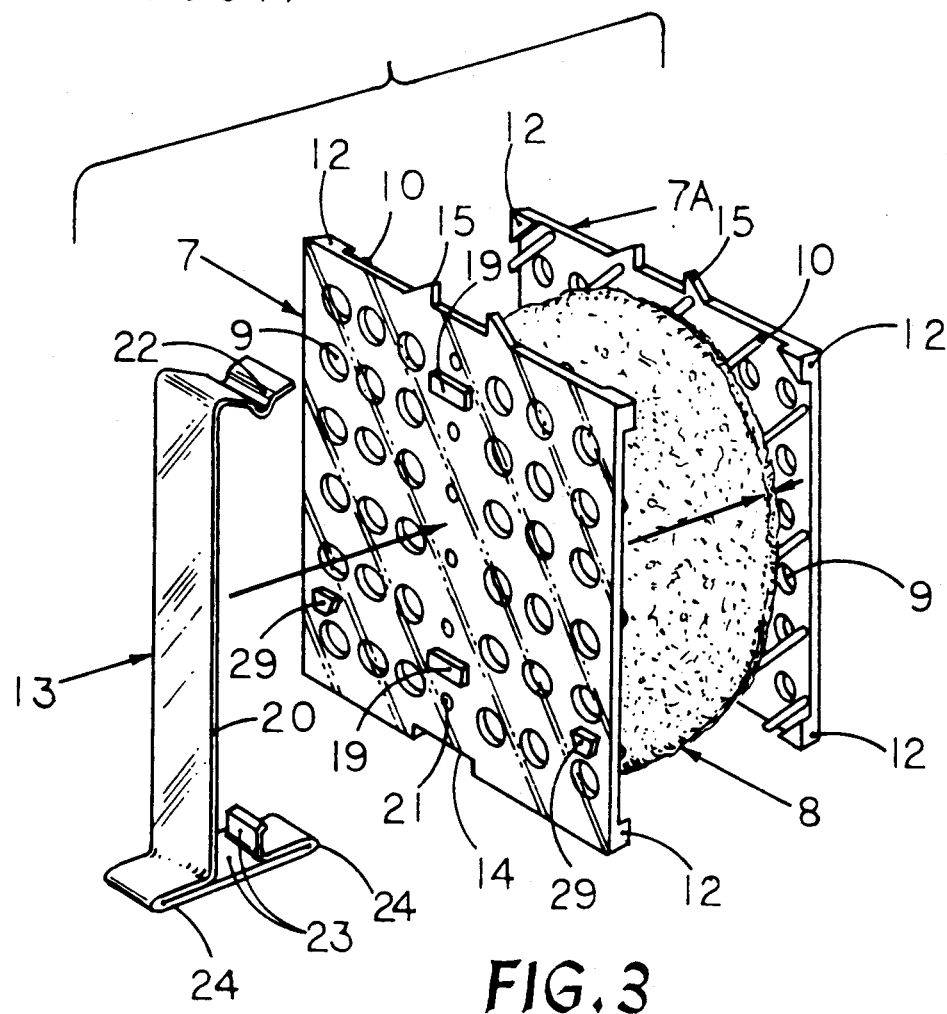

TACO SHELL

FIELD OF THE INVENTION

This invention relates to cooking corn tortillas.

BACKGROUND OF THE INVENTION

A fresh "uncooked" corn tortilla is a flat thin circular cake, typically 6 inch in diameter, 1/16 inch thick and weight of about 1 ounce made of coarse corn meal and is commercially partially baked. In this state it is firm but pliable. Commonly, the corn tortilla is next cooked, deep-fried using a U-shaped mold to form a rigid, edible crispy taco shell wrapper. The molds, usually made of stainless steel and perforated to allow for the flow of oil and escape of water, include inner and outer U-shaped nesting components that hold the corn tortilla therebetween. In commercial units, an array of several molds is deep fried at approximately 350° until most moisture is removed from the corn tortilla at which point the components are separated and the texture of the taco shell edible wrapper is crispy and rigidly fixed into the typical U-shape, which may be filled with various ingredients, e.g. cooked ground meat, grated cheese, chopped onions, shredded lettuce and diced tomatoes, with appropriate seasonings.

Taco shell cooking devices available for home purchase and use have imitated commercial deep fried method but on a smaller production scale. However, long cooking times, large quantities of expensive oil and high energy requirements needed to maintain high temperatures and the inherent hazard of hot oil on a stove top have discouraged their widespread use. The inconvenience of home cooking can be avoided by purchasing packaged pre-cooked shells, but at a higher price. Further, many precooked shells are very brittle and require careful handling when filling and eating to prevent shattering.

In addition, avoiding excess animal and vegetable fats and oils is believed to be of great nutritional importance. The higher the initial moisture content of a deep fried material, the higher will be the oil absorption during frying.

SUMMARY OF THE INVENTION

The invention includes a cooked tortilla, preferably in the form of a taco shell edible wrapper which may be easily, quickly and cheaply prepared from a purchased fresh uncooked corn tortilla, e.g. at home by non-professional cooks. The preferred taco shell has desirable textural (crunchiness and eating characteristics) properties with the absence of any leathery or sharp brittle texture. Preferably, the tortilla has at least two separate textures: a fully cooked, crispy, crunchy texture, as described above, which makes up most of the surface of the shell and a second pliable texture which allows the shell to be flexed without cracking. Preferably, the second texture is provided in a narrow strip across the diameter of the shell forming a flexible spine. Thus, the shell can be easily handled according to normal practice, without shattering. The taco shell can be folded into the typical taco U-shape and filled, or it may be filled with ingredients while laying flat, then folded into the U-shape afterwards, a unique convenience not available with present day fully cooked taco shells whether made in the home or purchased precooked. In addition, the flexible spine has been found to make the taco much easier to eat because the flexible spine region holds the shell together so that the first bite doesn't shatter the shell and cause the filling to spill onto clothing, etc. In this way, the shell reduces the need for paper holders and the like, which act to collect the shattered shell and its contents, and can interfere with taste enjoyment.

The novel taco shells of the invention may be produced in a dry heat process (i.e., without the introduction or trapping of steam or moisture) such as in a conventional or convection oven, but most preferably in a microwave oven, using a cooking frame configured to properly expose the tortilla to the heating source. A controlled amount of blistering (an air pocket separation from one side of the shell) and bubbling (separation on both sides of the shell at a particular location) may be produced which provides a desirable eating texture. The vast majority of tortilla surface separations during cooking are bubbles, not blisters, and both tend to be restricted or confined solely to the predefined pockets such as diamond shape areas of the device, (explained in more detail later). The surface or wall of the bubbles and blisters have a thinner cross-section. This contributes to a lighter more pleasant crunchy texture. Most food products with high internal moisture, including breads, absorb microwave radiation to a high degree. Some breads can take on a leathery character while others will burn internally, especially in a microwave oven. Fresh corn tortillas although technically a bread, are characterized by their thinness, typically only 1/16 inch thick with no crust, high density and low moisture content (about 8 ounces per pound or 50% by weight), compared to ordinary breads. It has been discovered that corn tortillas can be successfully cooked, with dry heat means, especially with microwave radiation directly to the crispy state and not suffer from the above problems. With suitable heat resistant construction materials for the apparatus, the corn tortilla may be cooked by dry heat means such as that provided by conventional or convection ovens. It is believed that microwave radiation, which penetrates rapidly to the interior of a thin food product by heating of the water contained therein allows the desirable formation of bubbles and blisters.

The cooking frame preferably includes a series of rigidly positioned and spaced ribs which partially contact the surfaces of the tortilla and acts to disperse moisture vapor and by their height and spacing also to control tortilla surface bubbling and blistering. Additionally the frames control undesirable distortions of the tortilla such as extreme deviations from planarity in the fully cooked crispy regions. Preferably, the cooking frame includes two perforated rigid and reusable frame components between which the fresh purchased uncooked corn tortilla is positioned. The frame components are preferably constructed of microwave energy transparent material typical of many utensils available for such use. One or the other (or both) of the frames is combined with a conductive microwave attenuating screen, suitably separated from the tortilla by a short distance to attenuate by a controlled amount the microwave energy the tortilla receives in a strip across its diameter. Screen length, shape, width, size and position of openings and separation distance from the tortilla can be used to control cooking of the tortilla spine such that it will remain flexible but still partially cooked, while the remainder of the tortilla is cooked simultaneously at an accelerated rate so that these adjacent areas will be firm and crispy at the conclusion of the cooking period. The tortilla needs no turning or interruption during cooking. A base tray can be associated with the frame to hold a number of frames and to maintain proper spacing and contain the frames during handling when placing into or removing from the microwave oven. A U-shaped frame may be used without the attenuating screen to produce a preformed taco shell in a microwave oven.

In one aspect, the invention features a corn tortilla having two separate textures, a predominately crispy texture that breaks under flexure and a flexible texture.

In another aspect, the invention features a cooking apparatus for cooking a corn tortilla having a frame member with a support surface constructed to maintain contact with the tortilla and allow the controlled passage of moisture vapor, and a control member to reduce the exposure of the tortilla to cooking energy over a desired portion.

In another aspect, the invention features producing a cooked tortilla by starting with a fresh uncooked tortilla, applying cooking energy to the tortilla in sufficient amounts to produce a predominately crispy texture, while limiting exposure of a portion of the tortilla to the cooking energy to produce a lesser cooked portion with a flexible texture.

In a particular aspect, the frame is designed to microwave and process purchased fresh, uncooked, Mexican-style corn tortillas. Perforated frames of suitable size to fully contain a corn tortilla are provided, composed of microwave energy transparent material and used in conjunction with an attenuating conductive screen which when selectively positioned across the diameter of the tortilla attenuates microwave energy in that area so as to reduce by a controlled amount the direct transmission of microwave radiation into the corn tortilla in that area, while other selected areas are not attenuated as much and are simultaneously receiving more energy. All the areas may be furnished with various perforations and ventilating means to provide selective moisture vapor control means such that in the finished product at least two separate and distinct textures are created, one across the central diameter or spine in the form of a strip, which maintains a greater moisture content and is partially cooked and more pliable or flexible, and at least two adjacent areas which maintain a much lesser moisture content and are more firm and crispy, the separate textures are distinctly apparent in the finished product, when properly microwaved or cooked.

Features of these aspects may be combined. In addition, particular aspects of the invention may include one or more of the following features. The flexible portion is in the form of a narrow spine across the diameter of the tortilla allowing flexure of the tortilla about the portion between a substantially flat configuration and a U-shaped edible taco shell configuration, without breaking. The crispy texture is preferably cooked to a greater extent than the flexible texture, typically all of the tortilla is at least partially cooked. The tortilla may be more flexible in the center of the spine than at the outer edge of the spine. The spine center is symmetrically, progressively more flexible from the edges of the spine to the center of the spine, formed by controlling the exposure progressively and symmetrically during cooking. The flexible portion has a moisture content of about 15 to 30% by weight and the crispy portion has a lower moisture content than the flexible portion, e.g., about 1 to 3% by weight. The tortilla is about 6-7 inch in diameter and the spine is about 1.5 inch in width or less. The tortilla is substantially free of consumer added fat or oil. The cooking apparatus includes, raised from the support surface, a series of rib members constructed to contact, at least at some portions of the tortilla during cooking to prevent substantial expansion and distortion of the tortilla. The ribs are arranged in a pattern to control the size of blisters and bubbles on the tortilla. The frame member includes a pair of identical but opposing support surfaces constructed to be arranged on either side of a tortilla including rib patterns to partially contact the tortilla on either side of the tortilla. The ribs on each support surface are arranged in a parallel series. The frame ribs on one side of the tortilla can be at an angle with respect to the parallel frame ribs on the other side, forming pockets for controlling formation of bubbles and blisters. Adjacent ribs are separated by about 1 inch or less, preferably about 0.75 inch. The ribs extend about 0.10 inch or less from the support surface. The blisters and bubbles of the cooked tortilla are about 0.75 inch in width or less and extend about 0.1 inch or less from one surface of the tortilla. A control member constructed to reduce the exposure of the tortilla to cooking energy over a desired portion such as across the diameter is provided. The frame is formed of a microwave transparent material constructed for the easy passage of microwave energy, and the control member is constructed of microwave reflective material and adapted for positioning on one side of the tortilla. The control member is positioned less than about 0.300 inch, preferably, about 0.150 inch to 0.200 inch from the tortilla surface during cooking. The control member may include apertures for controlled passage of microwave radiation and moisture vapor. The control member may be curved in cross-section and positioned such that part of the surface of the member may be in closer proximity to the tortilla at the center of the spine than at the edges of spine to allow progressively decreasing exposure from the edges of the spine to the center of the spine. The control member is removable for allowing a single uniform texture throughout the finished product. A base tray is provided such that multiple frames can be maintained in the preferred orientation and spacing.

Other advantages, aspects and embodiments follow.

DESCRIPTION OF THE PREFERRED EMBODIMENT

We first briefly describe the drawings, Drawings

In the accompanying drawings, like numerals are employed to designate like elements throughout.

FIG. 1 is a top view of a cooked tortilla taco shell according to the invention;

FIG. 2 is the cooked tortilla taco shell of FIG. 1 in U-shape taco shell configuration, prior to filling with ingredients;

FIG. 3 is a perspective exploded view of a tortilla cooking apparatus according to the invention, and ribs shown in phantom lines on member 7 for clarity;

PRODUCT

Figure 4:
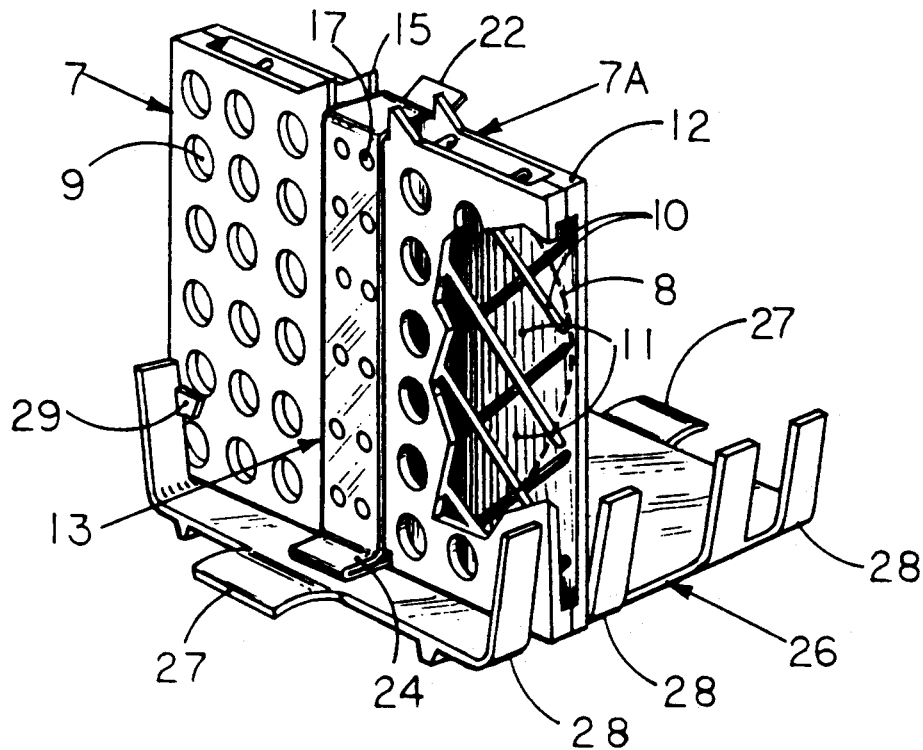
FIG. 4 is a partially cut away perspective of the apparatus of FIG. 3 in the assembled configuration with the ribs illustrated in the cutaway to show an important design feature and situated on a base tray; with perforations in support member 7A removed for clarity.

Referring to FIGS. 1 and 2, a tortilla 1 according to the invention is shown to include textural differences between fully cooked and crispy areas 2 and a flexible spine 3. The spine includes a more flexible less cooked region 5 between two regions 4 which represent a transition texture between the two crispy areas 2 and more flexible region 5. The tortilla includes bubbles and blisters 6, primarily in the crispy areas 2, that may be of various width and extension from the tortilla surface. Typically, the flexible spine contains little or no bubbles or blisters except those present in the fresh tortilla prior to cooking. Preferably, the maximum size of the bubbles and blisters are controlled such that the tortilla has a desirable eating texture and allows ease of handling and eating. Most preferably, the bubbles and blisters are about 0.75 inch or less in width and about 0.10 inch or less in extension from the uncooked tortilla surface. The spine 3 is not cooked beyond the point where the texture is such that the tortilla breaks on substantial flexure, e.g., from a flat configuration (FIG. 1) to a U-shaped taco configuration (FIG. 2). While portions of the spine may be completely uncooked, most preferably, all of the spine area is partially cooked to some degree to give a somewhat flexible and firm but not crispy texture. The spine strip may be cooked to continuously lesser degrees from the edges of the spine, adjacent the crispy portions to the center of the spine. Preferably, in the crispy areas 2, approximately 7.5 to 8.0 ounces of moisture per pound is removed from fresh tortillas (about 97%-99% of the original moisture present) to produce a moisture content of about 1%-3%. In the adjacent flexible spine 3, on average approximately 5 ounces of moisture per pound is removed from fresh purchased tortillas (about 60-70% by weight of moisture originally present removed) to produce a moisture content of about 15 to 30% by weight (all percentages given herein are by weight). The width of the spine is about 1.0 inch for a 6 inch shell. The spine area is about 20-30% of the total area. The cooked taco shell can be filled in a flat position and folded into the taco U-shape afterwards or folded and then filled in the conventional manner as shown in FIG. 2.

Manufacture

Figure 5:
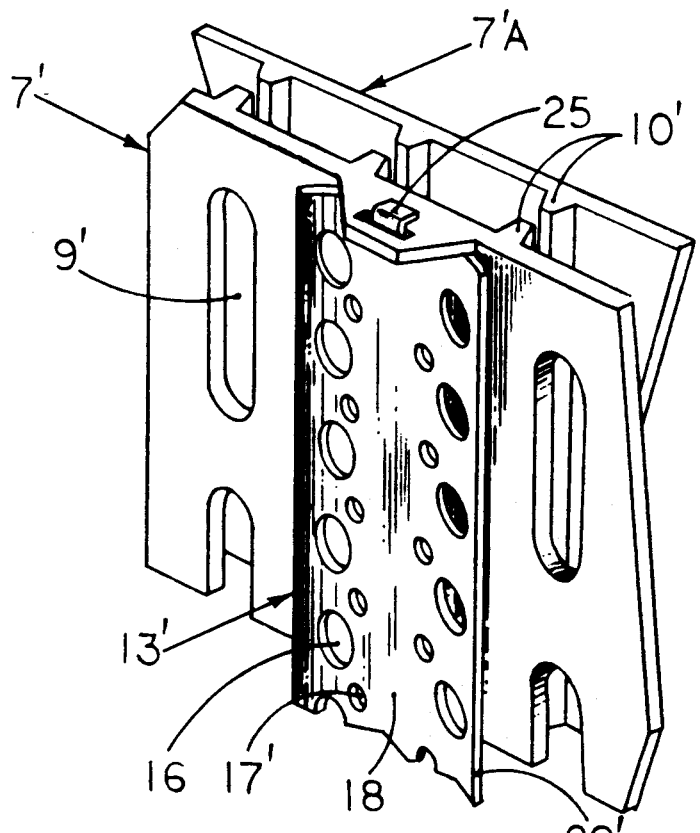
FIG. 5 is a portion in an enlarged perspective of a cooking frame with an alternative control element and permanent attachment means.

Referring to FIGS. 3 and 4, an embodiment of cooking frame apparatus for preparing cooked tortillas according to the invention, preferably in a microwave oven, includes duplicate support components 7, 7a with a corn tortilla 8 (shown uncooked) between. (The perforations 9 are not shown and tortilla 8 is shown in phantom in FIG. 4 for clarity of other details.) The apparatus further includes a control means 13 for controllably reducing the exposure to cooking energy of a region across the diameter of the tortilla. The frames are constructed of microwave energy transparent material, e.g., plastic, including perforations 9 (about 0.1875 inch in diameter), that provide an open area of typically 20-30% of each frame component. The perforations may have many geometric shapes including elongated slots and other patterns. In FIG. 5, another embodiment of the cooking apparatus is illustrated in which the support components 7' 7'A have longitudinal perforations 9' and a control member 13' of curved shape to create variable spacing. The apparatus maintains at least partial contact with the tortilla during cooking to avoid gross distortions from planarity such as bending in the fully cooked areas. The perforations in the support components may be numerous as possible, provided the structural strength of the frame is not sacrificed. For packaged fresh uncooked tortillas from 6.0 and 6.5 inches in diameter, frames 7.0 inches square may be used. A workable frame thickness is typically 0.070 inch.

Each frame component 7, 7a may include parallel raised ribs 10 integrally connected or molded into the frame components, extending typically about 0.10 inch from the plane of the support component and having a width about 0.080 inch at the top of the extension with a draft angle of 7° and typical spacing of about 0.75 inch. The frame ribs on opposite frame members can be oriented, parallel and opposite to one another, along their full length (e.g., FIG. 5) or preferably the ribs can be at an angle to one another (FIGS. 3 and 4). The ribs in combination with the perforations 9 allow escape paths for moisture vapor which is being evaporated by microwave energy, assisted also by flow from, e.g., a microwave oven fan. The ribs in addition, allow controlled expansion of surface separations in the form of bubbles and blisters which contribute to a varying texture that provides a desirable crunch while eating. By selecting rib height, bubble and blister height can be controlled since contact of the tortilla with the frame support surface prevents further expansion. Similarly, with proper rib spacing, the width of the bubbles and blisters can also be controlled. With the opposing frames ribs at an angle to one another, a pattern of diamond shaped pockets 11 (FIG. 4) bordered on parallel sides on opposite faces of the tortilla, are created, the area of which can be adjusted by rib spacing and angle to aid in restricting uncontrolled lateral growth of bubbles and blisters. For example, as illustrated in FIGS. 3 and 4 at frame component 7, ribs are angled 20° to the left (shown in phantom lines facing the drawing sheet), while the opposite identical frame 7a has ribs angled 20° to the right, (when they are opposed) such that a total angle of 40° is subtended and diamond shaped pockets 11 of about 0.75 inch on a side are created. The configuration in which the ribs are angled reduces clamping pressure on the tortilla between the two frames which can be caused by frame warping or variations in the thickness of the tortilla (e.g., due to various manufacturers specifications or lack of quality control) because the area at which the ribs on opposing frames oppose each other (as in FIG. 4) is reduced. Spacers 12 can be used to effectively eliminate most if not all clamping pressure by maintaining 0.0625 inch space (spacing between ribs 10' shown more clearly in FIG. 5), the nominal thickness of a typical tortilla between opposing ribs when components 7, 7a are brought together.

The frame also includes a cooking control member 13 such as a conductive screen, made, e.g., of food service quality stainless steel or perforated aluminum. The screen is positioned across one face of the tortillas' diameter or mid-section by, e.g., grooves 14 and elevated projections 15 on the support member 7 (FIGS. 3 and 4). Many other means of control member centering are possible. The control member attenuates cooking energy across and along a narrow center strip or spine 3 (as in FIGS. 1 and 2) while the remainder of the tortilla cooking proceeds simultaneous at an accelerated rate. The screen is preferably adjacent only one face of the tortilla, thus allowing the opposite face to be fully exposed to microwave energy through the frame. A screen of proper configuration could be constructed with the basic embodiments described to shield both sides of the tortilla mid-section or spine. The open areas 17 in the control member may vary in size and spacing to allow controlled microwave energy penetration. For example, as illustrated in FIG. 5, large openings 16 (about 0.250 inch in diameter) provide for more intense microwave radiation and more rapid moisture vapor removal from the tortilla than the smaller openings 17' (about 0.125 inch in diameter, also shown in FIG. 4). The area 18 without openings, particularly when in closer proximity with the tortilla retains greater moisture, thus providing additional flexibility in this area. These features can be used to tailor the tortilla's partially cooked but still pliable areas 5 and 4 within close limits to the desirable degree of cooking.

Spacers 19 (FIG. 3) on the back or outside surface of the frame component 7, non-adjacent the tortilla, can be provided to maintain a distance between the control member 13 and the tortilla for escape of moisture such that, e.g., the control member may be a metal piece without perforations. Spacers 19 may not be needed if the rib height and frame thickness are such that sufficient spacing is achieved by the sum of the two dimensions. If ribs are utilized and their height plus the frame thickness exceeds approximately 0.300 inch a control member may be moved inside the frame adjacent the tortilla. Control member effectiveness in reducing exposure to radiation generally diminishes when it is positioned greater than about 0.300 inch from the tortilla. Typically, the control member is about 0.200 to 0.150 inches from the tortilla surface. Without some screen distance from the tortilla particularly at the edges or borders of the control member 20 (FIG. 3), excessive heat may be generated and cause accelerated and uneven overcooking. Referring to FIG. 5, the control member or screen 13' is of curved shape to create variable spacing. Greater distance from the tortilla at the edge of the screen than the center of the screen, controls cooking time and texture in the tortilla mid-section to provide more exposure to microwaves at the edge of the spine than toward the center of the spine. The overall design configuration, frame thickness, rib height, attenuating screen width and distance of screen from the tortilla surface, determine the position and size of ventilating frame perforations 21 underneath the attenuating screen (FIG. 3). Normally, however, they will be a substantially lesser percentage of openings than other frame perforated areas to adjust the moisture level of the tortilla in this area such that several bands of flexibility or textures can be adjacent to one another. Varying the screen width when the spacing is optimum varies the tortilla mid-section width flexible portion accordingly. A nominal screen width being on the order of 1.25 inches. The screen may be provided with an end clip 22 which serves to hold frame components 7 together (FIGS. 3 and 4). A separate clip portion of nonconducting material may be attached to the clip 22 for ease of handling after use (not shown). Opposite end 23 of clip 22 wraps around both frames. Support 24 is only one of many means which serves to keep the frames self standing and can be attached by spot welding, rivets or be an integral part of control member 13 as illustrated. The control member may also be permanently attached to one of the frame components by employing a bent tab 25 or other attaching means. From the above description of the screens, frames, ribs, perforations and structures it can be seen that all the means necessary of controlling the tortilla mid-section and adjacent finished texture or textures are present. The tortilla will cook properly without turning or interruption.

Referring to FIG. 4, a base tray 26 can be used to support several frames. The tray is provided with handles 27 for ease of handling. The tray performs three main functions, (1) the holders 28 maintain proper spacing of a plurality of frames. This is important, since if placed too close to one another, microwave energy interference may cause variations in microwave timing and uneven cooking. If placed too far apart, microwave oven space is wasted. Preferably, adjacent frames are about 2 inches apart. (2) The holders 28 in conjunction with frame projections 29 prevent shifting left or right, forward or backward of the frames when handling and placing into or removing from the microwave oven. (3) During cooking a small amount of moisture is released into the tray and collected. No clamping force of the frame is necessary or desirable; formation of bubbles during cooking, exerts some modest pressure against the holders which are designed to resist this pressure. When the device is used in conjunction with a base tray, control member 13 can be removed if it is not permanently attached, for making a flat cooked tortilla of uniform texture based only on microwave time control. This feature is useful in making tostadas and other Mexican delicacies. If the control member is permanently attached to the component, it need not be fixed in the vertical position as illustrated. Alternative support arrangements, e.g., the base tray would also allow the control member to be oriented at other angles, provided it was centrally located across the tortilla diameter or spine. The tray should be kept as low as possible to take advantage of smaller microwave units. Large base trays could be used to accommodate a plurality of tortilla frames for large households and commercial cooks in restaurants to expedite the cooking and making of highly desirable tacos.

Employing embodiments described above, cooking time of about 2 minutes is typically employed in a microwave oven rated at about 600–700 watts, although microwave cooking time may vary.

Other Embodiments

Other applications and embodiments within the invention include preparation of tosdata shells and corn tortilla chips by using small tortilla pieces or pre-scoring means and separating conventionally-sized tortillas after cooking. In these embodiments, the control member may be eliminated or formed of a microwave transparent material such that the entire tortilla is uniformly exposed to cooking energy. With some tortilla dough formulas which do not produce bubbles or blisters upon cooking, ribs and spacers may be eliminated entirely from the cooking apparatus and still produce a food product with an acceptable texture. In this case the amount of contact of the tortilla with the frame during cooking is determined by the percent of open area of the frame.

Further embodiments are within the following claims:

I claim:
1. A food product comprising:
   a tortilla edible shell with at least two separate, different textures distributed into at least two regions, including, a first region of predominantly crispy texture that breaks under flexure, and, adjacent said first region, a second region of relatively more flexible texture, said second region extending generally across said shell.

2. The food product of claim 1 wherein:
said second region of said shell having said flexible texture is in the form of a narrow spine along the diameter of said shell, said spine allowing folding of said shell between a substantially flat configuration and a U-shaped configuration without breaking.

3. The food product of claim 2 wherein said crispy texture is cooked to a greater extent than said flexible texture.

4. The food product of claim 3 wherein all of said shell is at least partially cooked.

5. The food product of claim 3 wherein the texture is more flexible in the center of said spine than at the outer edge of said spine.

6. The food product of claim 5 wherein said shell is progressively, symmetrically less flexible from the center of said spine to the edge of said spine.

7. The food product of claim 3 wherein said second region of said shell having said flexible texture has a moisture content of about 15 to 30% by weight and said first region of said shell having said crispy texture has a lower moisture content than said second region.

8. The food product of claim 7 wherein the moisture content of said first region is about 1 to 3% by weight.

9. The food product of claim 2 wherein the shell is about 6-7 inch in diameter and said spine is about 1.5 inch in width or less.

10. The food product of claim 3 wherein said crispy texture includes separations in selected areas of predetermined size and distribution.

11. The food product of claim 10 wherein said separations are blisters and bubbles of about 0.75 inch in width or less which extend about 0.1 inch or less from the surface of the shell.

12. The food product of claim 1 wherein said shell is substantially free of added fat or oil.

13. A food product comprising:
a tortilla edible shell with at least two different textures, distributed into three separate regions, including, two crispy regions of similar and predominantly crispy texture that breaks under flexure, the crispy regions being adjacent to opposite sides of a flexible region of relatively flexible texture, shaped in the form of a band or spine along a diameter of the shell.

14. The food product of any one of claims 1, 7, 8, 9, 10, 12 or 13 wherein said shell is a corn-dough based shell.

15. The food product of claim 13 wherein said shell is a cooked U-shaped taco shell edible wrapper wherein said flexible texture is in a spine region along a diameter of said shell.

* * * * *